F. L. McCULLOCH.
MACHINE FOR MAKING BOLTS.
APPLICATION FILED MAR. 30, 1905. RENEWED MAR. 25, 1909.
921,558.
Patented May 11, 1909.
4 SHEETS—SHEET 1.
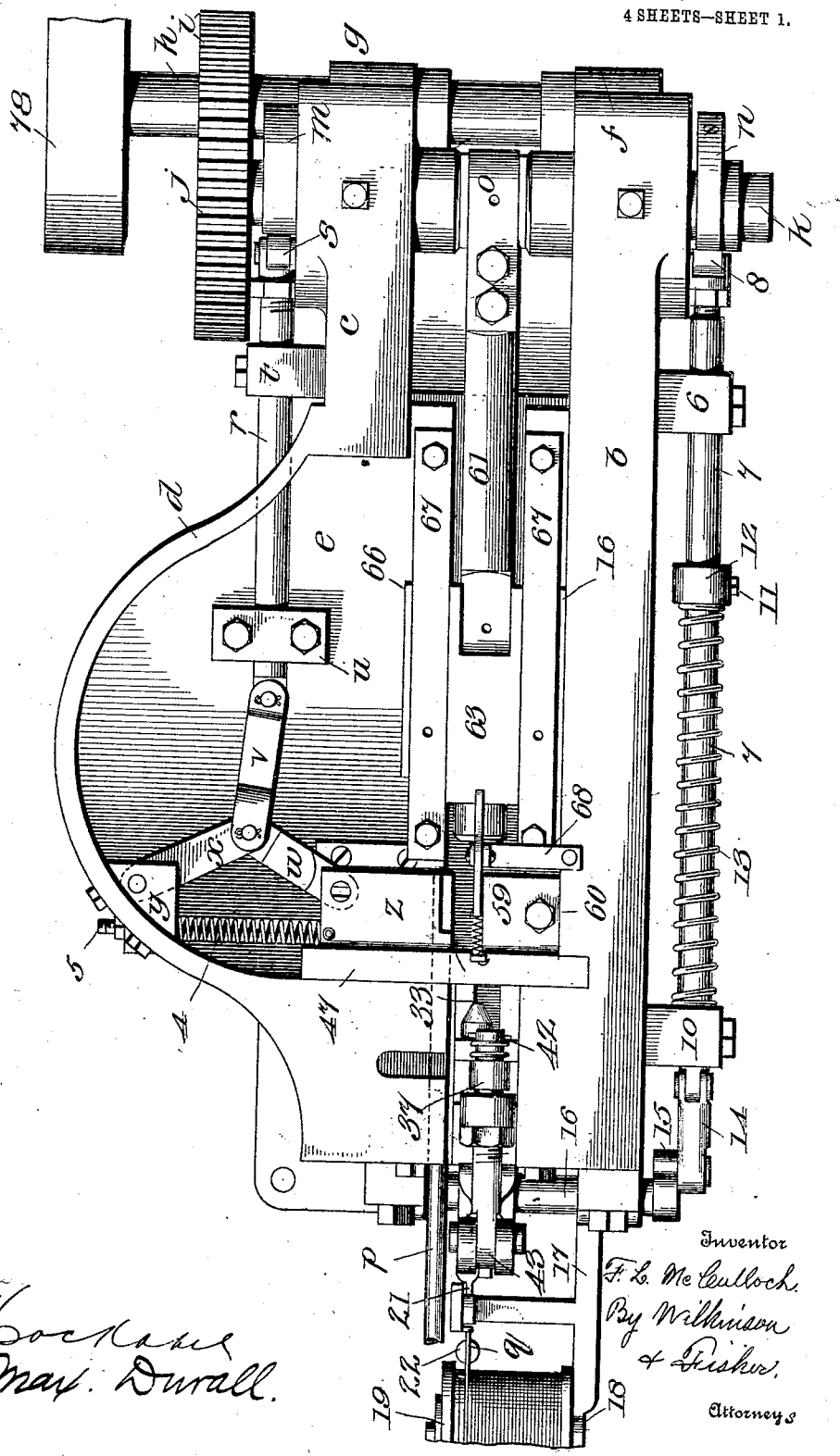

F. L. McCULLOCH.
MACHINE FOR MAKING BOLTS.
APPLICATION FILED MAR. 30, 1905. RENEWED MAR. 25, 1909.
921,558.
Patented May 11, 1909.
4 SHEETS—SHEET 2.
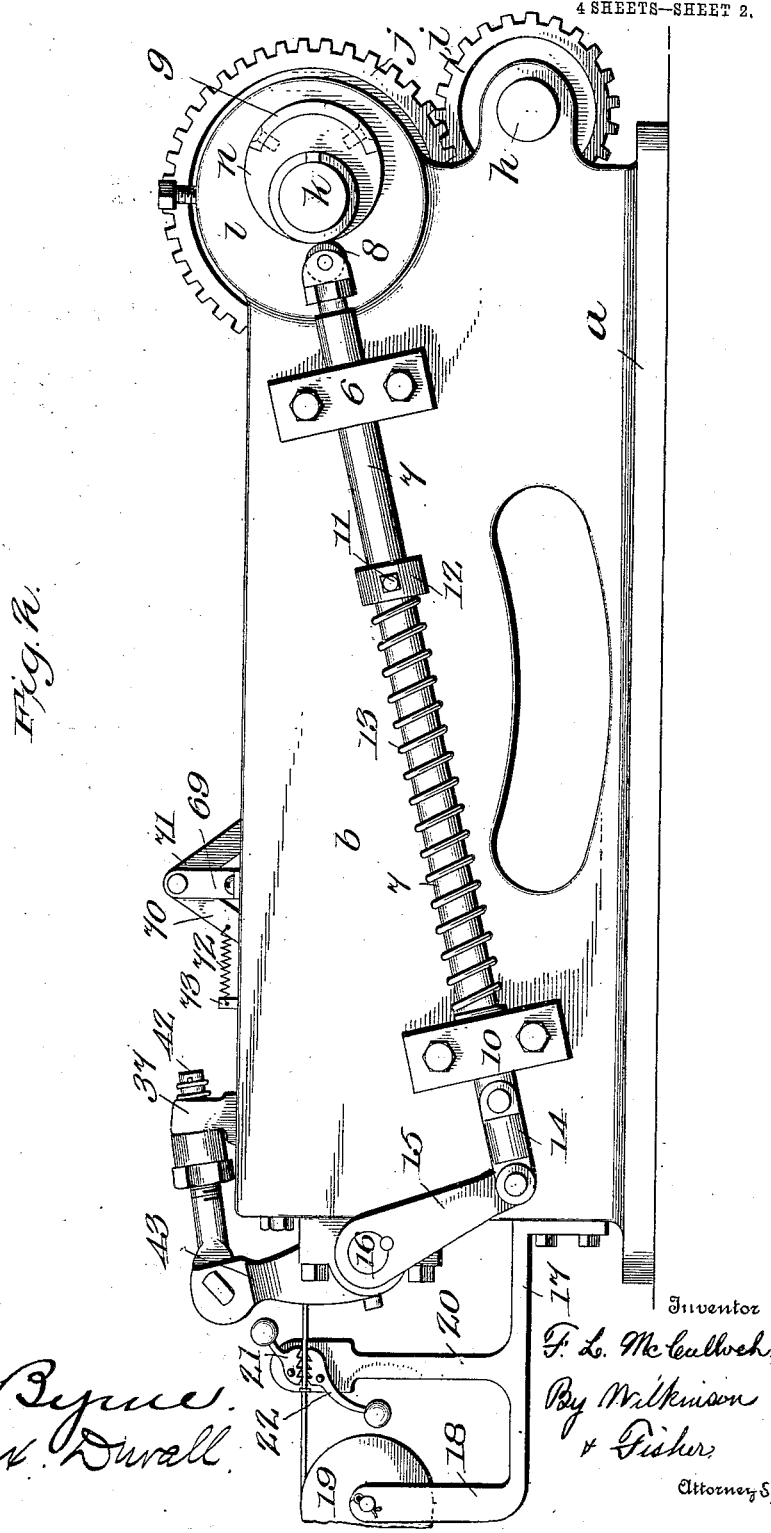
Witnesses
Geo. A. Byrne
W. Max. Duvall
Inventor
F. L. McCulloch
By Wilkinson & Fisher
Attorneys F. L. McCULLOCH.
MACHINE FOR MAKING BOLTS.
APPLICATION FILED MAR. 30, 1905. RENEWED MAR. 25, 1909.
921,558.
Patented May 11, 1909.
4 SHEETS—SHEET 3.
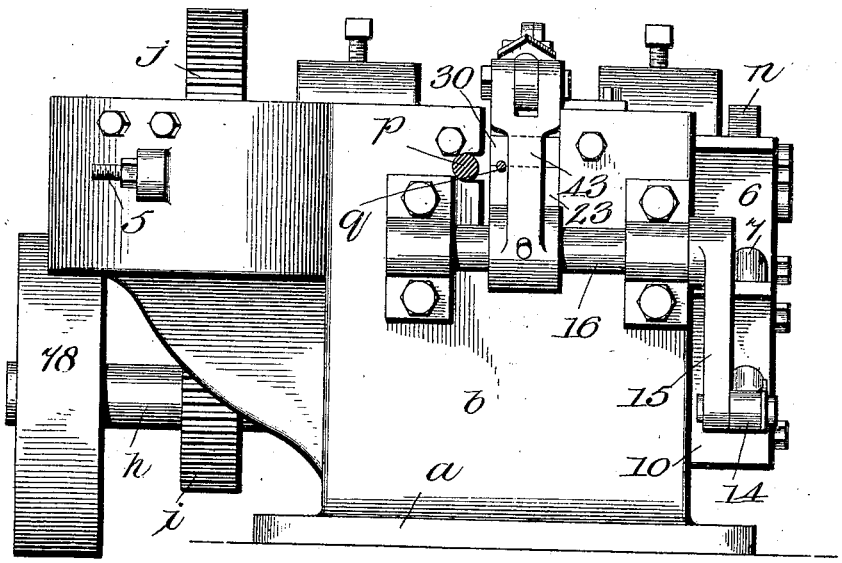
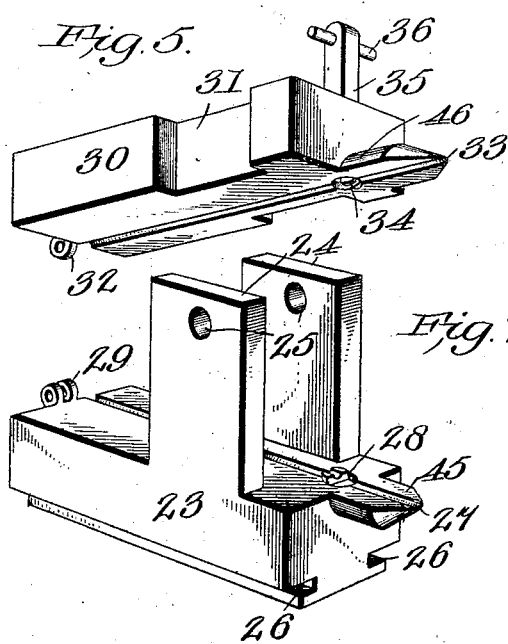
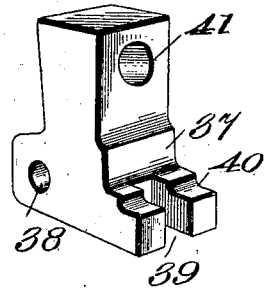

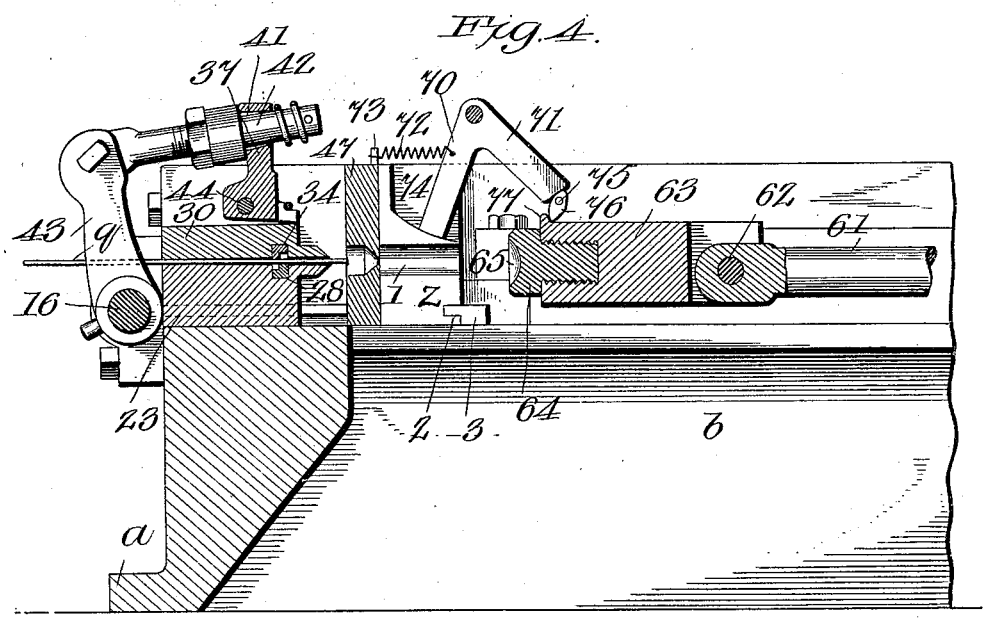
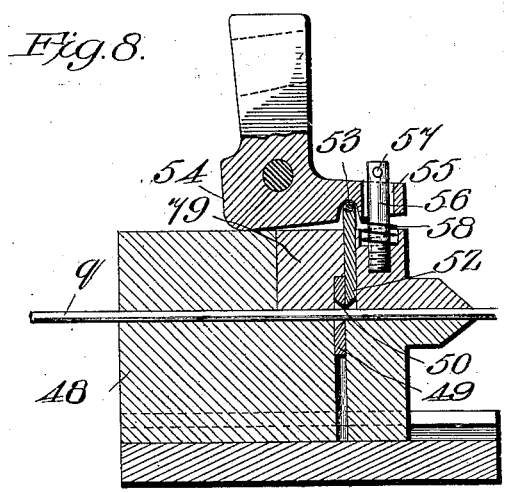
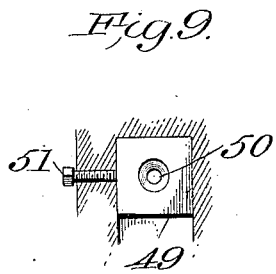

UNITED STATES PATENT OFFICE.

FREDERICK LEE McCULLOCH, OF TAMPA, FLORIDA, ASSIGNOR TO LEE MacDONELL, OF TAMPA, FLORIDA.

MACHINE FOR MAKING BOLTS.

No. 921,558.          Specification of Letters Patent.          Patented May 11, 1909.

Application filed March 30, 1905, Serial No. 252,955. Renewed March 25, 1909. Serial No. 485,813.

*To all whom it may concern:*

Be it known that I, FREDERICK LEE MC-CULLOCH, a citizen of the United States, residing at Tampa, in the county of Hillsboro and State of Florida, have invented certain new and useful Improvements in Machines for Making Bolts; and I do hereby declare the following to be a full, clear, and exact description of the invention, such as will enable others skilled in the art to which it appertains to make and use the same.

My invention relates to machines for making bolts, especially the particular bolt described in the patent granted to me February 23, 1904, No. 752,698.

The object of my invention is to produce a simple, compact, economical and easily operated machine for making the bolts described in the patent referred to.

With this object in view, my invention consists in the construction and combinations of parts of the machine hereinafter described and claimed.

In the accompanying drawings:—Figure 1 is a top plan view of my improved bolt machine. Fig. 2 is a side view of the same. Fig. 3 is an end view of the same, showing the metal rod and wire in section. Fig. 4 is a cross section of one end of the same. Figs. 5, 6 and 7 show details of the wire advancing and cutting mechanism, and Figs. 8 and 9 show details of a modified form thereof.

The main parts of the machine are of a well known type of bolt machines.

$a$ represents the base of the machine, preferably made of cast iron, and provided with practically solid sides $b$ and $c$, which may be cast parallel to each other.

$d$ represents an extension cast as a part of the side $c$ having a floor $e$, all the parts mentioned being cast in a single piece.

The sides $b$ and $c$ are provided with projecting ears $f$ and $g$, in which is journaled the driving shaft $h$ provided with a gear wheel $i$ which meshes with the gear wheel $j$ on the shaft $k$, which shaft drives the feeding, cutting, punching and heading devices. The shaft $k$ is journaled in enlargements $l$ in the sides $b$ and $c$. The shaft $k$ is provided with a cam $m$ for driving the devices for cutting off the metal rod from which the bolt is to be made, with a cam $n$ for driving the means which force the wire into the hot bolt and with an eccentric surrounded by the strap $o$ for driving the heading devices.

$p$, Fig. 3, represents a hot rod of metal which is regularly fed into the machine, and $q$ represents the wire which is forced into the end of the hot metal at or about the time that the head is formed thereon.

The parts for cutting off specified lengths of the hot rod $p$ and delivering the parts cut off to the heading part of the machine will now be described.

$r$ represents a sliding rod having an antifriction roller $s$ pivoted thereon which is in contact with the cam $m$, the rod $r$ being carried in bearings $t$ and $u$ on the main part of the machine. To the end of the rod $r$ is pivotally attached one end of a link $v$, to the other end of which are attached the two members $w$ and $x$ of a toggle lever. The member $x$ is pivoted at the other end to a sector shaped portion $y$ attached to the part $d$ of the machine, and the member $w$ is pivoted to a sliding casting $z$, the end of which is shown in Fig. 4, which acts as a cutter for the hot iron rod and which also acts to carry along the portion cut off from said rod in front of the header, 1, Fig. 4, representing a groove in which the cut off portion is carried. This cutter is slotted as shown at 2 for the reception of the guide 3, which is fixed to the main casing. A spring 4 is attached at one end to the part $z$ and at the other end to a bolt 5 passing through the sector shaped part $y$, said bolt being used for securing one end of said spring and adjusting the tension thereof.

The means for forcing the wire into the section of the hot rod that has been cut off and for cutting the wire off after it has been forced into said rod will next be described.

6 and 10 represent bearings secured to the side $b$ of the machine through which passes a sliding shaft 7, on one end of which is pivoted an antifriction roller $h$ which contacts with the cam $n$, which cam may be provided if desired on the whole or a part of its surface with a wearing face 9 made of hardened steel. On the shaft 7 is adjustably secured by means of a screw 11, a stop 12 and a spring 13 coiled around the shaft 7 and pressing against the bearing 10 and stop 12 keeps the roller 8 always in contact with the cam $n$. To one end of the shaft 7 is pivoted a link 14, and this link is also pivoted to a crank 15 rigidly secured to the shaft 16.

17 represents a bracket bolted to one end of the main frame of the machine and carrying two arms 18 between which is pivoted the spool 19, on which the wire is coiled. 20 represents an upward extension on said bracket on which are pivoted above and below the wire the gravity pawls 21 and 22 to prevent the backward motion of the wire after one end thereof has been cut off. The wire is gripped and fed forward by the means shown detached in Figs. 5, 6 and 7, and as shown in said figures, the wire gripping means consist of a lower portion 23 provided with two parallel upwardly extending side plates 24, perforated as shown at 25, and which act as guides for the upper member. This lower member of the wire gripping device is provided with undercut grooves as shown at 26, which register with similarly shaped projections on the frame of the machine by which it is guided. The lower member is provided with a semicircular groove 27, with a knife 28, and with a hinge member 29, all as shown in Fig. 7. The upper member 30 of the wire gripping device is provided with two recesses 31 in its sides which engage with the plates 24, with a hinge member 32 adapted to fit within the hinge member 29, with a semicircular groove 33, a knife 34 and an upwardly extending arm 35, provided with a pin 36. Above the member 30 is mounted the cam portion or toe 37, which is provided with a perforation 38. A pin 44, passing through the perforations 24 and 38, holds the three members 23, 30 and 37 together, while allowing a certain amount of play between the members 30 and 23. The part 37 is slotted as shown at 39 for the reception of the arm 35, and is cut down into a curve, as shown at 40, for the reception of the pin 36, which loosely engages therewith. The part 37 is also provided with a perforation 41 for the reception of the driving arm 42 which is pivotally attached to a crank 43, mounted on the shaft 16, the perforation 41 being slightly conical in shape and a little larger than the shaft 42 to permit the part 37 to tip upon the pin 44 at the proper time, to force the knife 34 down against the knife 28 at the proper time to sever the wire. It is obvious that the rotation of the shaft $k$ will by the means just described push forward at certain intervals the wire feeding device composed of the three members 23, 30 and 37, thus forcing the wire into the hot bolt section, and that at the end of the stroke, the part 37 will tilt, the ends thereof forcing the part 30 down against the part 23, thereby severing the wire. This severing of the wire takes place just as the end of the wire strikes the hot bolt, and the knife members form a stop or abutment which prevents the wire from being pushed back by the pressure caused by the wire entering the bolt. The parts 23 and 30 are provided with similarly shaped but oppositely arranged grooved projections 45 and 46, tapered off at the end into a cone, which parts grip the wire for a considerable length, and which enter a correspondingly shaped recess in the solid platen 47, thus preventing the wire from bending.

In Figs. 8 and 9, a modification of the wire feeding and severing device is shown. The part 48 which carries the wire is perforated for the passage of the wire therethrough which is guided by undercut grooves as stated. The wire runs through a knife 49 which is provided with a conically shaped aperture 50. The knife 49 is held in a slot in the block 48 by means of a screw 51. With the fixed knife 49 coöperates a movable knife 52 which is pivoted as shown at 53 to the lower end of a rocking toe 54 similar to the part 37. The toe 54 is perforated as shown at 55, and through the perforation passes a pin 56 provided with a cross pin 57, and around the pin 56 is wound a spring 58. Obviously the forward movement of the block 48 will feed the wire forward, and at the end of said movement just as the wire strikes the bolt, the toe 54 will be forced down, thereby severing the wire at the proper time. The spring 58 merely acts to hold the part 79 of the gripping device, which part is loosely carried on the part 48, in its proper position, until the toe 54 is forced down, causing the knife 52, in connection with the knife 50, to sever the wire.

The means for holding the bolt while the wire is being forced into it, and the means for forming a head on said bolt at the same time, will next be described.

The sliding casting $z$ is provided with a groove 1, and this coöperates with a fixed casting 59 attached by a bolt or bolts 60 to the side of the machine. This casting 59 has a semicircular groove located opposite the groove 1. The movement of the casting $z$ cuts off a given length of the rod $p$. A movable gage may be used if desired, to determine the length of the rod cut off. The cutting action takes place between the edge of the groove 1, which is hardened for this purpose and which coacts with the sides of a perforation in the platen 47, through which the rod $p$ passes. The part that is cut off is carried along in the groove 1 until it is confined between the parts $z$ and 59, at which time it is in the proper position for the wire to be inserted. The head is then formed on the bolt by the means hereinafter described, and at the same time the wire is pushed in by the means already described. Owing to the fact that the wire, which is preferably of steel, is cold, and that the bolt is hot and that the wire is forcibly pushed into the bolt under a great pressure, the wire and the bolt become welded together, forming a homogeneous mass, as can readily be proved by sawing a bolt in two, in which case it will be found impossible to distinguish the line of union between the bolt and the wire.

The heading device will next be described. To the eccentric strap $o$ is fastened an arm 61, the outer end of which is pivotally attached as shown at 62 to the header 63, in the end of which is screwed the hardened steel die 64, provided with a depression 65 of the shape adapted to produce the proper shape of head when the end of the bolt is compressed. It should be understood that the length of the rod $p$, which is cut off, is always slightly in excess of the width of the parts $z$ and 59, so that a portion of the hot rod projects, which portion is acted upon by the die 64 as the header 63 reciprocates, thus compressing the end and forming a head. The part 63 is provided with outwardly extending side portions 66, which pass beneath guides 67 fastened to the frame of the machine, whereby the header 63, by the revolution of the shaft $k$, is caused to move back and forth in a straight line.

The means for ejecting the completed bolt from the machine will next be described.

Fastened to the side $b$ of the machine is a bracket 68, which terminates in an upwardly extending arm 69, to the top of which is pivoted a bell crank lever having arms 70 and 71. A spring 72 is attached to the arm 70 and to a projection 73 on the platen 47, which spring normally holds the arm 70 in the position shown in Fig. 4.

The reciprocating casting $z$ is cut away as shown at 74 to afford a space for the movement of the arm 70. The arm 71 has on its end a pin 75 bent around and carrying a pivoted gravity pawl, and the header 63 is provided with an upwardly projecting lip 77, with which said pawl is adapted to engage when the parts are in the position shown in Fig. 4. As the header 63 moves forward to make the head on a bolt, it lifts and passes under the free end of the pawl 76 and engages therewith, as shown in Fig. 4. On the reverse movement of the header 63, it pulls with it the arm 71, and therefore the arm 70, the edge of which strikes the head of the bolt which has just been formed and forcibly ejects it from the grooves in which it has been held and in which it might possibly stick. The bolt then falls between the guides 67 and the sides $b$ and $c$ of the machine into the open space below where it may be caught in any suitable receptacle.

The operation is as follows:—A spool of wire having been mounted in the machine, and the wire having been pushed forward until it is engaged by the wire feeding and cutting device, the heated rod $p$ is pushed in through the slot in the machine to the proper distance either by an attendant or by separate feeding means, not shown. Power being applied to the pulley 78, the shaft $h$ is rotated, rotating the shaft $k$. This operates the rod-severing part $z$, which cuts off a part of the rod and brings it up against the stationary part 59. At this time, the wire $q$ is fed forward against the end of the hot rod, the wire gripping means 23 and 30 being moved up against the platen 47, and the header 63 is moved up against the free end of the hot rod which projects out beyond the parts $z$ and 59. By this means a head is formed on one end of the bolt, and the wire is forcibly pushed into the other end of the bolt, forming a complete weld. As the header returns to its normal position, the bolt is thrown out of the machine, to be finished in the usual way by having the thread cut thereon after it has cooled.

Having thus described my invention what I claim as new and desire to secure by Letters Patent is:—

1. In a bolt machine, the combination of means for holding a bolt blank, grippers for gripping and moving forward a wire, and forcing it into said blank and for supporting it while so forced in, and means for shearing off said wire, substantially as described.

2. In a bolt machine, the combination of driving means, means for forming a head on one end of a bolt blank and for holding said blank, grippers for gripping and moving forward a wire and forcing it into said blank while so held, and means for shearing off said wire, substantially as described.

3. In a bolt machine, the combination of means for holding a bolt blank and means for forcing a wire into one end of said blank, said means including two members hinged together at one end and provided with grooves and with means for preventing the wire from bending, including semi-cylindrical extensions, severing knives on said members, and means for moving said members laterally relatively to each other, and for moving them longitudinally to force the wire into the blank, substantially as described.

4. In a bolt machine, the combination of driving means, means for holding a bolt blank, means for supporting and feeding a wire forward and cutting it at the proper time, said means including two members hinged together at one end, each member being grooved and provided with a semi-cylindrical extension and with a knife, and connections between said driving means and said wire holding means, operating to feed the latter forward and to cause the knives to sever the wire at the proper time, substantially as described.

5. In a bolt machine, the combination of operating means, means for holding a bolt blank, combined wire-supporting, feeding and severing means, consisting of two parts hinged together, one of said parts being provided with guides for the other part, and each of said parts being grooved and provided with a knife and with a semi-cylindrical extension, a toe pivotally connected to one of said parts and constructed and arranged to engage the other part, and connections between said toe and said operating means, substantially as described.

6. In a bolt machine, the combination of operating means, means for holding a bolt blank, combined wire-supporting, feeding and severing means, consisting of two members hinged together, one of said members being provided with guides for the other member, and each of said members being grooved and provided with a knife and with a semi-cylindrical extension terminating in a conical point, a guide for said semi-cylindrical extension provided with a perforation terminating in a conical end, a toe pivotally connected to one of said members and constructed and arranged to engage the other of said members, and connections between said toe and the operating means, substantially as described.

In testimony whereof, I affix my signature, in presence of two witnesses.

FREDERICK LEE McCULLOCH.

Witnesses:
H. G. JOHNSON,
D. S. DUNN.